(12) United States Patent
Schumann et al.

(10) Patent No.: US 6,571,983 B1
(45) Date of Patent: Jun. 3, 2003

(54) METHOD AND DEVICE FOR DISPENSING FLAT FORMS

(75) Inventors: Klaus Schumann, Neuwied (DE); Peter Steinborn, Neuwied (DE)

(73) Assignee: LTS Lohmann Therapie-Systeme AG, Andernach (DE)

( * ) Notice: Subject to any disclaimer, the term of this patent is extended or adjusted under 35 U.S.C. 154(b) by 0 days.

(21) Appl. No.: 09/856,198

(22) PCT Filed: Nov. 13, 1999

(86) PCT No.: PCT/EP99/08758
§ 371 (c)(1),
(2), (4) Date: May 17, 2001

(87) PCT Pub. No.: WO00/30963
PCT Pub. Date: Jun. 2, 2000

(30) Foreign Application Priority Data

Nov. 21, 1998 (DE) .......................... 198 53 737

(51) Int. Cl.⁷ .............................. G07F 11/66
(52) U.S. Cl. .......................... 221/25; 221/26
(58) Field of Search .............. 221/1, 25, 26, 221/33; 206/389, 390, 820

(56) References Cited

U.S. PATENT DOCUMENTS

| | | | |
|---|---|---|---|
| 2,789,640 A | 4/1957 | Belden | |
| 3,416,396 A | * 12/1968 | Donner | 83/214 |
| 3,767,039 A | 10/1973 | Schröter | |
| 3,920,122 A | * 11/1975 | Koehlinger et al. | 156/257 |
| 4,282,056 A | 8/1981 | Okui | |
| 5,240,755 A | 8/1993 | Zimmer | |
| 5,656,285 A | 8/1997 | Sablotsky et al. | |

FOREIGN PATENT DOCUMENTS

| | | |
|---|---|---|
| DE | 44 06 976 C1 | 6/1995 |
| DE | 195 47 691 C1 | 4/1997 |
| EP | 0 345 606 A2 | 12/1989 |
| GB | 397826 | 11/1931 |
| WO | WO 87/00121 | 1/1987 |
| WO | WO 95/17304 | 6/1995 |

* cited by examiner

*Primary Examiner*—Kenneth W. Noland
(74) *Attorney, Agent, or Firm*—Frommer Lawrence & Haug LLP

(57) ABSTRACT

The invention relates to a method for dispensing flat forms, such as labels, stickers, transdermal therapeutic systems, flat medicaments for oral application, etc, in a controlled manner. According to said method, the outer contour of the flat form (103) is punched out from a strip-shaped starting material and connecting bridges (105) hold the flat form (103) and the edge of the punched layer together. These connecting bridges (105) break when the flat forms are dispensed via a deflector edge (106). The inventive method can be advantageously used for packing individual flat forms in primary packaging. The invention also relates to a specialised punching device used in the method.

22 Claims, 6 Drawing Sheets

METHOD AND DEVICE FOR DISPENSING FLAT FORMS

The invention relates to a method for dispensing flat forms, such as labels, patches, stickers, transdermal therapeutic systems, medicaments for oral administration, etc. By controlled dispensing, the flat form can be transferred to a transport web and/or into a device suitable for producing a primary package.

Dispensing (transfer) of individual flat forms is known in principle. To do this, the individual flat forms first have to be made from an endless web. This is done, for example, by contour punching. Such an individual flat form must then be freed, if necessary, from any remaining punch material (so-called lattice stripping) and is then conveyed to a dispensing device, for example a deflector edge or deflector roller. It is also possible for lattice stripping and dispensing both to take place at the dispensing device.

The following problems can often arise in this type of procedure. If the material from which the endless web is made is very elastic, the individual flat form may be carried together with the remaining punch material round the deflector edge, and no dispensing takes place. The same problem can arise if the individual flat form has an adhesive underside.

Another problem, namely the lack of exact positioning of the flat form during dispensing, can occur if the flat form is so light that just a light puff of air, an undesired electrostatic charge or a rolling-up of the flat form can cause it to slip or twist on the web. A controlled dispensing of individual flat forms on a sharp deflector edge is then likewise not possible.

It is an object of the invention to make available a method and a device for controlled dispensing of a flat form. In doing so, the intention is to avoid the disadvantages which often arise in the prior art (dispensing problems, positioning problems).

The object is achieved by means of a method in which a web-like starting material comprising at least two layers is transported into a suitable punching device, the outer contour of the flat form is then punched out from the web-like starting material, at least one point between the flat form and the rest of at least one layer of the web-like starting material not being punched through, and finally the flat form is dispensed on a dispensing device, with a break being made at the previously unpunched point.

For this purpose, the starting material of the flat form (such as labels, patches, stickers, transdermal therapeutic systems, medicaments for oral administration) is first brought into a web form. This is done, for example, by coating underlayers (for example laminates) with flowable substances or substance mixtures and then drying them, by lengthways cutting of wide rolls of paper, metals or plastics, by rolling of a viscous composition, by hotmelt extrusion, etc. The web-like material can be made up of one, two or several layers. The web-like starting material can also include an adhesive layer. A preferred embodiment is a multi-layer web-like starting material for the production of a TTS which includes a layer containing the pharmaceutical active substance(s), an adhesive layer, if appropriate a membrane controlling the release rate, a backing layer and, to protect the adhesive layer, a protective layer (so-called release liner, e.g. of synthetic polymer or aluminum film). Using such a laminate including at least three layers (protective layer, active-substance-containing adhesive layer, backing layer), the contour of the patch can also be punched-in prior to the actual method steps according to the invention, in an additional (i.e. advance) punching step. In this advance punching step, only the backing layer, active-substance-containing adhesive layer and any other layers present are punched through, but not the protective layer. The latter is punched only in the subsequent steps after remains of the punched layers have been stripped off, the aim being to ensure that the contour of the patch is smaller than the contour of the protective layer, which in this particular case corresponds to the outer contour of the flat form.

Another preferred embodiment is a film-like medicament for oral administration, which can consist of a single non-adhesive layer.

In the first method step, the web-like starting material is transported into a suitable punching device. This can be done, for example, by means of a device which grips the web-like starting material via two opposite movable stamps, then advances it and thereafter releases it (so-called sled) or by means of a winding device located at the end of the web. This step can be discontinuous or continouous with a constant or variable speed.

In the second method step, the outer contours of the individual flat forms are punched in the web-like starting material in the suitable punching device. The term "punching" signifies the technical procedure by which a separating line is introduced into an object. Other terms used for this such as cutting, dividing, splitting, tearing etc. are intended to be included here too. In the final result, after such a procedure on two previously connected volume elements of a material, there is no longer any material join.

Examples of suitable punching devices known to the person skilled in the art are lifting punches (punching tool with strip-steel cut) and rotary cutting rollers. These punching devices have cutting edges which establish the outer contour of the individual flat forms. Another suitable punching device that can be used is a high-energy laser beam. This laser beam travels along the outer contour of the individual flat forms, and the material located there is vaporized. This second step can also be discontinuous or continuous with a constant or variable speed.

The punching in the suitable punching device is carried out so that either all the layers of the web-like starting material (that is to say the lowermost layer too) are punched, or, preferably when using two-layer or multi-layer web-like starting materials, at least the lowermost layer is not punched. This at least one layer then remains unpunched and can serve as transport web.

The particularity of punching the outer contours of the individual flat forms into the web-like starting material now lies in the fact that this contour is not punched completely from the respectively punched layers of the web-like starting material, but instead at least one point or just a few points of the contour are not punched, i.e. not separated through. At this point or points, therefore, after the second method step, there are still (tiny) bridges (holding points, connection pieces) in the respectively punched layers between the individual layers of the flat form and the remains of the web-like starting material of the respectively punched layer (or between the individual flat forms), which bridges have the technical function that the individual flat forms remain fixed (initially) at their position within the web-like material.

The position of these points (bridges, holding points, connection pieces) on the outer contour of the individual flat form depends on the geometric form of the latter and on its position within the web-like starting material. The position of this point/these points preferably lies in the rear part of the outer contour of the individual flat form. Rear part signifies that area of the individual flat form which, after the start of the dispensing of an individual flat form, is still located on that section of the web-like material lying between punching device and dispensing device (deflector roller, deflector edge).

However, the points (bridges, holding points, connection pieces) on the outer contour of the individual flat form can also lie in the front part of the outer contour, particularly in the case where the individual flat forms after the dispensing device are guided into a device which transports them onward at a higher speed than the speed at which the individual flat forms are fed to the dispensing device. Such a device can consist, for example, of two rollers pressing against each other. The higher speed of the onward transport compared with the transport speed on dispensing then causes the holding points to break.

The number and the dimensions of the bridges (holding points) on the contour depend on the material properties of the web-like starting material used (metal film, plastic film, paper, bonded fabric, woven fibers, etc) and on the thickness of the layers which are to be punched. In the case of relatively thick layers made from materials which are very resistant to tearing, it is possible to have only very small bridges between the individual flat form and the rest of the punched layer of the web-like starting material. In the case of relatively thin layers made from materials which are very sensitive to tearing, it is recommended to leave several punctiform or linear bridges upon punching.

The second method step does not therefore represent a complete punching-out of the outer contour of the individual flat forms, since, on account of these bridges (holding points), the individual flat forms are still joined to the respective layers of the remaining web-like starting material. Therefore, no genuine detachment has as yet taken place.

In the third method step, the punched web-like starting material is then guided via a dispensing device, for example a deflector edge or deflector roller, and the bridges (holding points) break to permit genuine detachment and dispensing of the flat forms thus individualized. The possibly present unpunched layers of the web-like starting material, and possibly present remains of the web-like starting material of the punched layers (for example punch lattices, remains of rounded corners) are guided around the dispensing device and in this way separated from the dispensed flat forms.

This third method step too can be discontinuous or continuous with a constant or variable speed.

The three method steps can be used particularly advantageously for packing flat forms in a suitable primary package. For this purpose, the individual flat forms which have been dispensed in an exact manner (i.e. in a controlled manner) are transferred to a second transport web which in turn is covered by a third web. By subsequent sealing of the edges and transverse cutting, sealed bags are obtained which each contain a flat form. The second transport web can also be a web of inelastic synthetic material (so-called thermoformed blister) which is provided with cavities and is later covered by a third web and welded.

As has already been mentioned, the individual method steps can be discontinuous or continuous and can be carried out with constant or variable speeds. A continuous execution of the whole method is especially suitable when using a rotary cutting roller or a laser as the punching device. A discontinuous procedure is likewise possible and is recommended when using a lifting punch or a laser.

The device according to the invention by which the flat form is brought into the punched form suitable for controlled dispensing is a special punching device which is used in the second method step. In the text which follows, punching device, as has already been mentioned, is intended also to designate a cutting device.

A characteristic feature of the punching device according to the invention is a cutting edge which has one or more interruptions, for example notches. When punching the outer contour of the individual flat form, a connecting bridge (holding point) arises at this point between the individual flat form and the remaining web-like material of the same layer. Depending on the size and number of these connecting bridges, they can be referred to as holding points, holding lines or perforation. In the case where a laser beam is used, the connecting bridge is obtained by means of the laser beam not traveling along the outer contour of the individual flat form at this point.

However, the form of this interruption of the cutting edge is of importance with respect to the height of the cutting edge. Thus, in rare cases it may be preferable for the interruption of the cutting edge to correspond to its height, whereas in some cases it is preferable for the interruption not to reach the height of the cutting edge. This is expedient if, for example, the outer contour of the flat form from a multi-layer web-like material is to be punched out completely from one or more upper layers, but only with connecting bridges in a layer lying under these. The interruption of the cutting edge then corresponds with the thickness of the connecting bridge.

Once the method according to the invention has been completed, a flat form is obtained which may be contained in a primary package such as a side-sealed bag or a blister pack. The flat form includes two or more layers, one of which can be adhesive and/or can contain a pharmaceutical active substance. The flat form is characterized by broken holding points on the outer contour of a support layer.

In a further embodiment of the method, an additional punching step, in which the outer contour of at least one layer of an at least two-layer starting material is punched out completely, i.e. without connecting bridges, can be carried out preferably directly after the transport step. This is followed by the punching step in which at least one point between a further layer of the flat form and the rest of this layer is not punched through. This procedure is especially advantageous if the contour of the layers punched through completely in this way encloses a smaller surface than the surface which encloses the outer contour of the layer, which is punched through only "with holding point".

Obviously, it is not possible to describe all the conceivable combinations of unpunched and punched layers and possible arrangements of the holding points. The following figures serve to provide a more detailed explanation of individual aspects of the invention:

FIG. 1 shows a perspective view of a two-layer web-like material with a lower layer (101) and an upper layer (102). Individual flat forms (103) of rectangular outer contour (104) rounded at the corners have been punched out from both layers of the web-like material. Holding points (105) remain in each case in the rear part of the outer contour of the individual flat form. The rest of the web-like material (107) is separated off at the dispensing device (106), with these holding points being broken.

Figure 1:
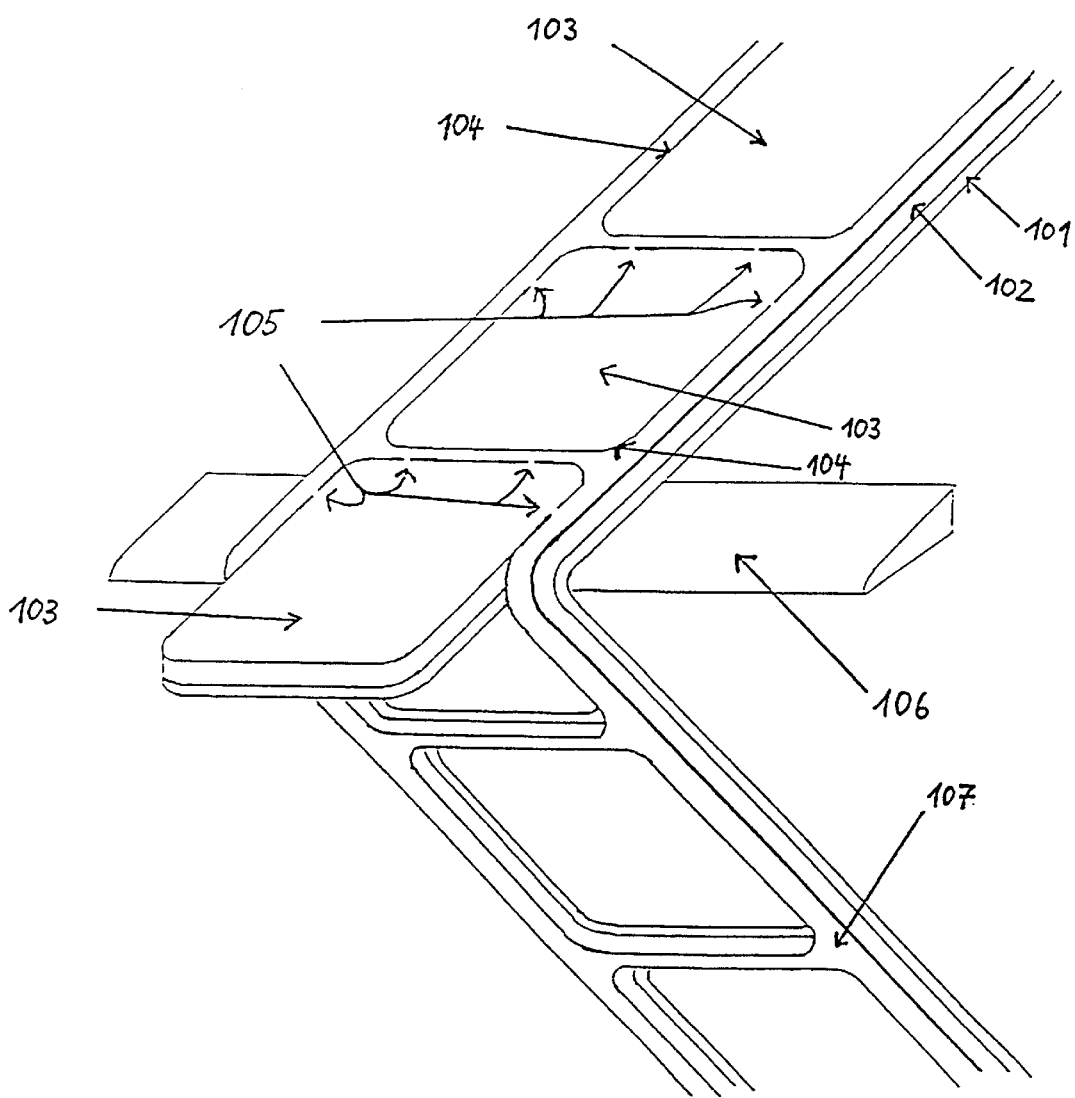
Figure 2:
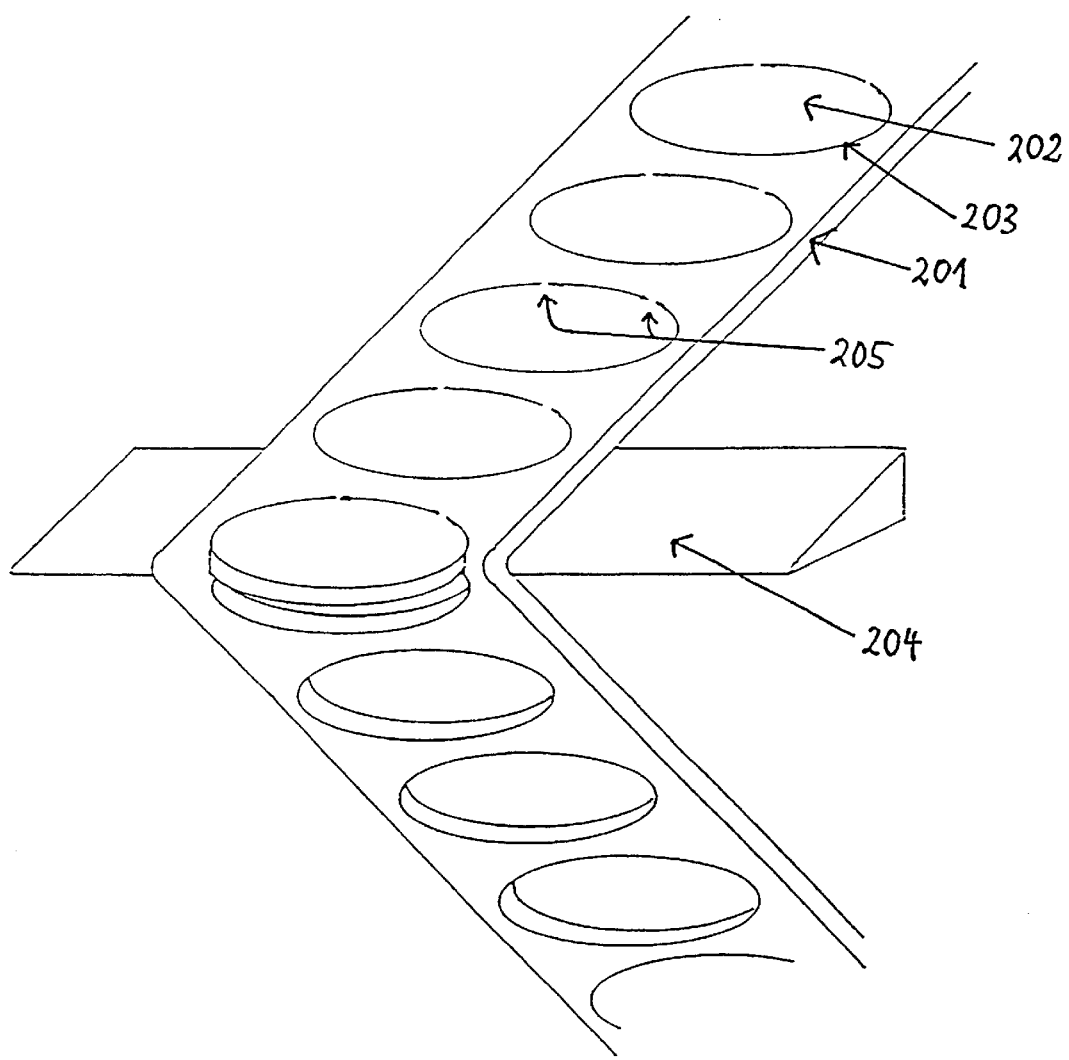
FIG. 2 shows a perspective view of a one-layer web-like material (201) from which flat forms (202) of circular outer contour (203) have been punched out. At the dispensing device (204), the individual flat forms are transferred and the not rest of the web-like material is separated off, with breaking of the holding points (205) in the rear part of the outer contour of the individual flat form.
Figure 3:
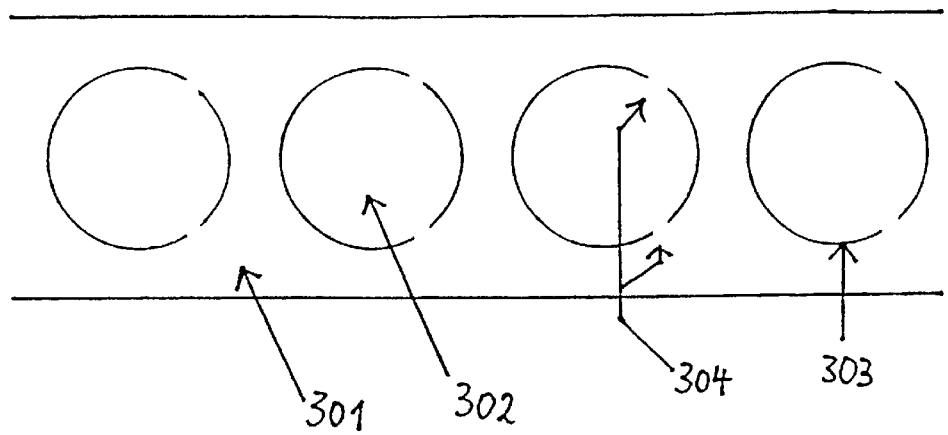
FIG. 3 shows a plan view of a web-like material (301) from the which individual flat forms (302) of round outer contour (303) and connecting bridges (304) in the rear part of the outer contour of the individual flat form have been punched out.
Figure 4:
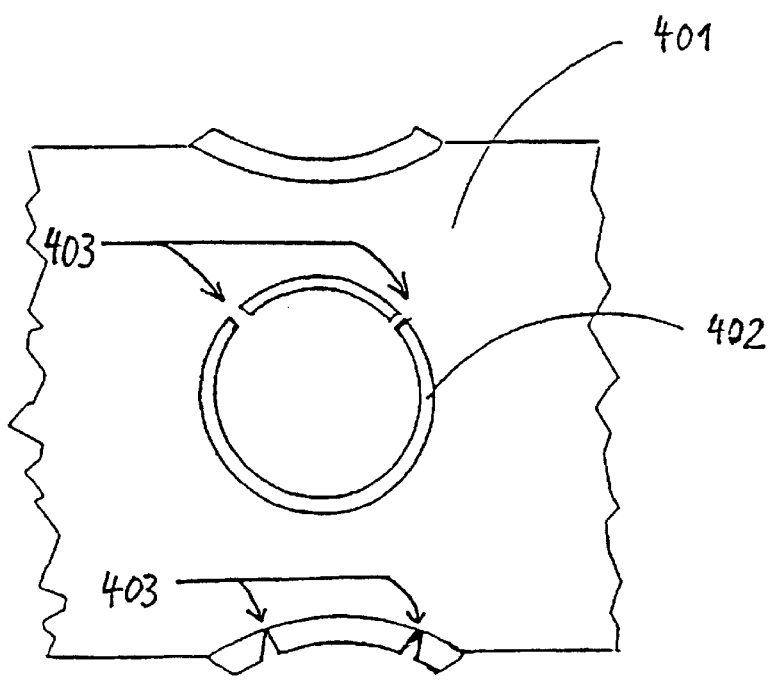

FIG. 4 shows the cutting edge (402) of a rotary cutting roller (401) with interruptions (notches) (403) for punching flat forms of round outer contour and connecting bridges to the rest of the web-like material in the rear part of the outer contour of the individual flat form. The interruptuions have the height of the cutting edge, which generates connecting bridges in all layers of a two-layer or multi-layer web-like material.

Figure 5:
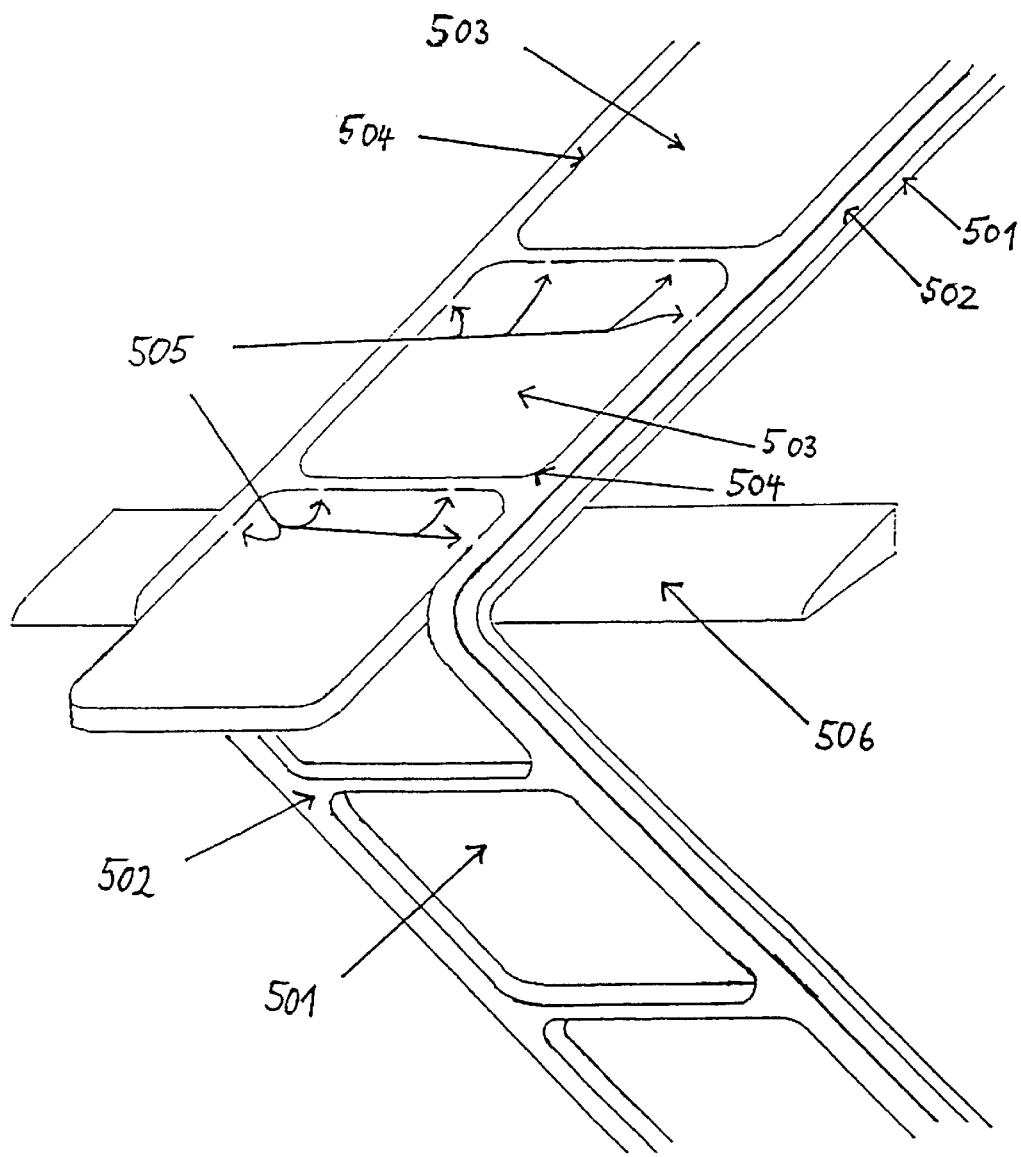

FIG. 5 shows a perspective view of a two-layer web-like material with a lower layer (501) and an upper layer (502). Individual flat forms (503) of rectangular outer contour (504) rounded off at the corners have been punched out exclusively from the upper layer (501) of the web-like material.

Holding points (505) in each case remain in the rear part of the outer contour of the individual flat form. At the dispensing device (506) the individual flat forms are separated from the rest of the web-like material of the upper layer (502) and from the whole of the unpunched lower layer (501), with these holding points being broken.

Figure 6:
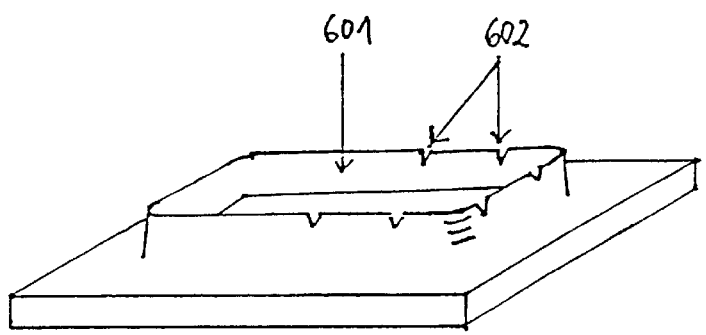

FIG. 6 shows the cutting edge (601) of a lifting punch with interruptons (602) for punching flat forms of rectangular outer contour and rounded-off corners, with connecting bridges to the rest of the web-like material in the rear part of the outer contour of the individual flat form. The height of the interruptions is smaller than the height of the cutting edge, which generates connecting bridges only in those layers of a two-layer or multi-layer web-like material which correspond with the height of these interruptions.

Figure 7:
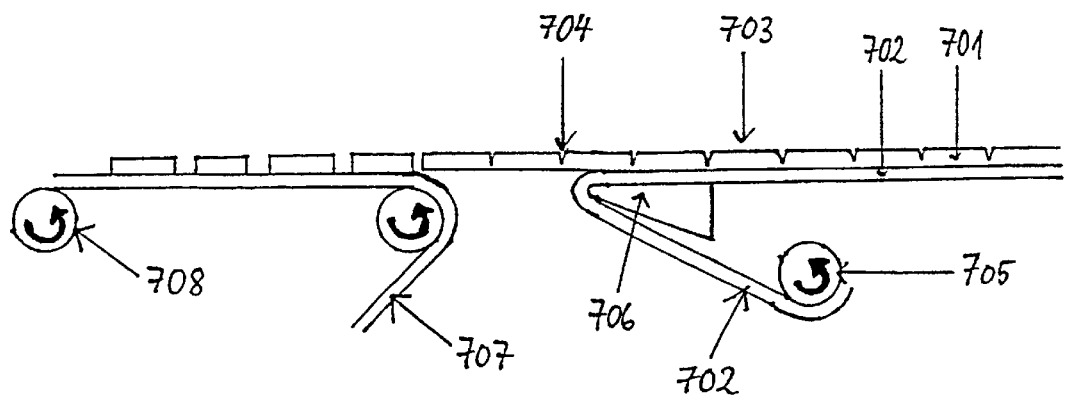

FIG. 7 shows a side view of a web-like material with an upper layer (701) and a lower layer (702). The outer contour of the individual flat forms (703) is punched in such a way that holding points (704) are located in the front part of the outer contour of the individual flat form. Only the upper layer (701) is punched through in this way. The roller (705) moves the two-layer web-like material at a certain speed to the dispensing device (706). The individual flat forms are transferred to a second transport web (707) which is moved by the roller (708) at a higher speed than the two-layer web-like material. The lower layer (702) of the two-layer material is separated from the individual flat forms (703) at the dispensing device. With breaking of the holding points (704), the individual flat forms are transferred to the second transport web (707) and detached.

Figure 8:
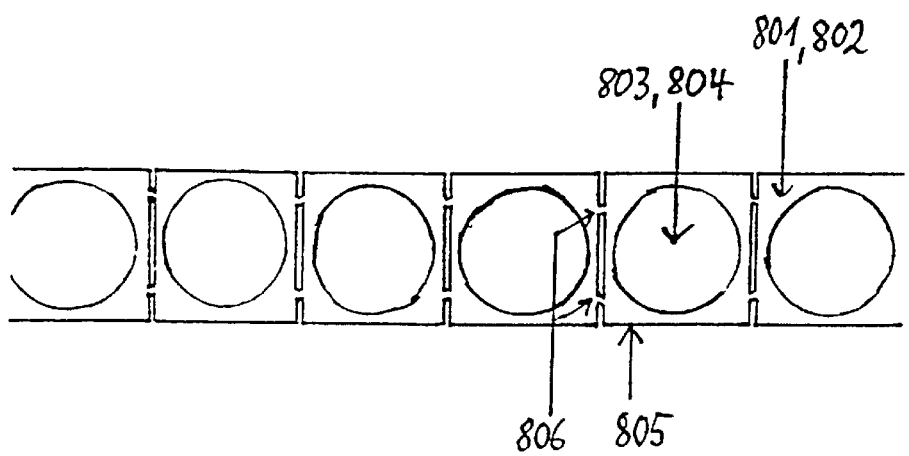

FIG. 8 shows a plan view of a four-layer web-like material with a lower layer of paper (801), and with a silicone-treated layer (802) located on top of it, and a composite layer of adhesive (803) which is covered by the uppermost layer of a nonadhesive plastic film (804). The outer contour (805) of the individual forms from the silicone-treated paper is square and has holding points (806). Individual flat forms of this structure can be dispensed according to the method represented in FIG. 7.

Figure 9:
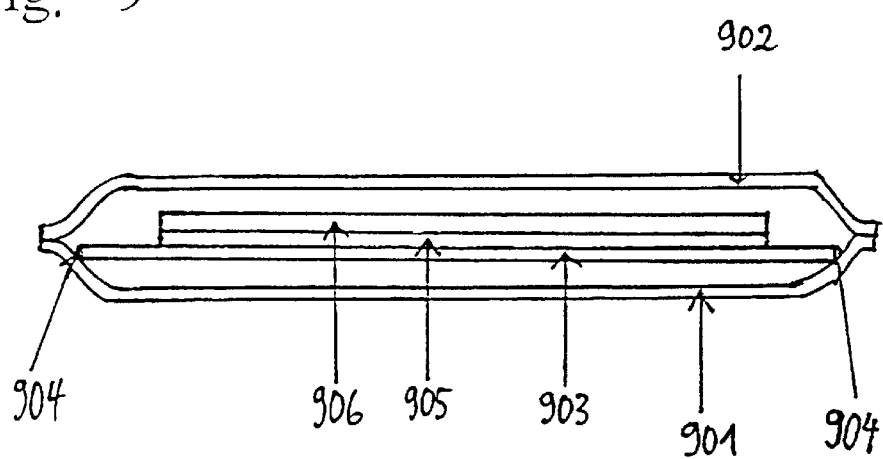

FIG. 9 shows a transverse section through a finished sealed-in TTS consisting of the lower web of the side-sealed bag (901), the upper web of the side-sealed bag (902), a support film (903) with broken holding points (904) in the rear part of the outer contour of the support film, an active-substance-containing adhesive layer (905) and a nonadhesive protective layer (906).

What is claimed is:

1. A method for dispensing a flat form, comprising the following steps:
    a) transporting a web-like starting material into a suitable punching device,
    b) punching out the outer contour of the flat form from the web-like starting material, wherein at least one point between the flat form and the rest of the web-like starting material is not punched through,
    c) dispensing the flat form on a dispensing device, by breaking the unpunched point between the flat form and the rest of the web-like starting material, thus forming an individual flat form, and
    d) transferring said individual flat form onto a second transport web which is part of a primary package.

2. The method as claimed in claim 1, characterized in that the web-like starting material has at least two layers.

3. The method as claimed in claim 2, characterized in that at least one of the layers of the web-like starting material is not punched.

4. The method as claimed in claim 2, characterized in that one of the layers of the web-like starting material is a layer containing active substance.

5. The method as claimed in claim 2, characterized in that one of the layers of the web-like starting material is an adhesive layer.

6. The method as claimed in claim 2, characterized in that the lowermost layer of the web-like starting material is a nonadhesive layer.

7. The method as claimed in claim 2, characterized in that the individual flat form is a TTS.

8. The method as claimed in claim 2, characterized in that the individual flat form is a self-adhesive label.

9. The method as claimed in claim 1, characterized in that the individual flat form is a medicament for oral administration.

10. The method as claimed in claim 1, characterized in that the primary package is a side-sealed bag.

11. The method as claimed in claim 1, characterized in that the primary package is a thermoformed blister.

12. The method as claimed in claim 1, characterized in that an additional punching step takes place in which the outer contour of at least one layer of an at least two-layer starting material is punched through completely.

13. The method according to claim 1, wherein the steps are performed discontinuously.

14. The method according to claim 1, wherein the steps are performed continuously with a constant or a variable speed.

15. A punching device for punching the outer, interrupted contour of an individual flat form wherein said device has a cutting edge which has at least one interruption, characterized in that the interruption of the cutting edge corresponds with the height of the cutting edge or is less than the height of the cutting edge.

16. The punching device as claimed in claim 15, characterized in that the interruption of the cutting edge is less high than the height of the cutting edge.

17. The punching device as claimed in claim 15, characterized in that it is a rotary cutting roller.

18. The punching device as claimed in claim 15, characterized in that it is a lifting punch.

19. A flat form having at least two layers, one of said layers comprising a pharmaceutically active substance, characterized in that one layer has broken holding points on the outer contour.

20. The flat form as claimed in claim 19, characterized in that it is a transdermal therapeutic system.

21. The flat form according to claim 19 wherein said form is contained in a side-sealed bag or a blister pack.

22. The flat form according to claim 20, wherein said from is contained in a side-sealed bag or a blister pack.

* * * * *